United States Patent Office 3,422,622
Patented Jan. 21, 1969

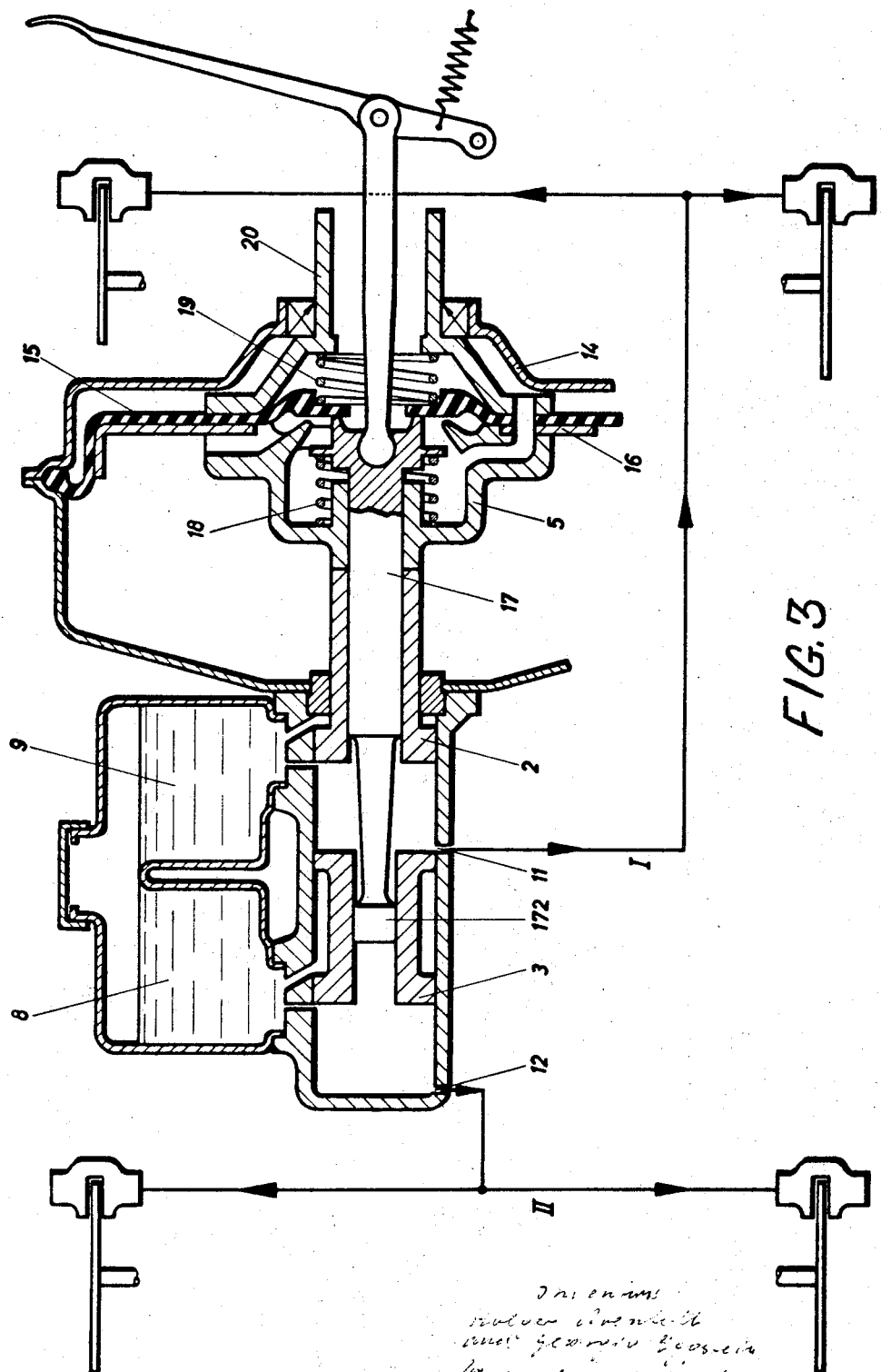

3,422,622
POWER BRAKE ARRANGEMENT
Holger Arentoft, Stuttgart, Germany, and Giorgio Eggstein, Turin, Italy, assignors to Ernst Heinkel, Aktiengesellschaft, Stuttgart-Zuffenhausen, Germany
Filed Nov. 17, 1966, Ser. No. 595,089
U.S. Cl. 60—54.5        14 Claims
Int. Cl. F15b 7/00; B60t 11/18

ABSTRACT OF THE DISCLOSURE

Two master pistons of a power brake form two chambers respectively communicating with two brake systems. A control rod is operated by a brake pedal to actuate a power booster to move the master pistons, and carries reaction pistons located in bores of the master pistons so that the pressures in both brake systems, or the pressure of one brake system if the other fails, are felt by the operator as a counterpressure on the brake pedal.

---

The present invention relates to a power brake arrangement, and more particularly to a brake arrangement including a plurality of brake systems controlled by pistons in a master cylinder.

The brake arrangement is of the type in which the brakes are at first controlled by the pressure exerted by the operator on the brake pedal, whereupon power means are actuated to operate the brakes.

The power brake arrangement of the invention includes preferably pneumatic power means which operate with subatmospheric pressure produced by the suction inlet of the engine of the motor car provided with the brake arrangement of the invention. However, power means operated by compressed air, or hydraulic power means also may be used.

It is the main object of the invention to obtain at the brake pedal an indication of the braking force produced by the power means.

Another object of the invention is to provide at the brake pedal or other operator actuated control means of the brakes, different distinguishable counterpressures indicating the momentary braking forces produced under different operational conditions.

Another object of the invention is to provide a power brake arrangement in which the counterpressure opposing the movement of the brake pedal by the operator depends on the actually exerted braking force, irrespective of whether all brake systems operate, or whether a brake system has failed.

Another object of the invention is to provide an indication of the actually applied braking force which is a function of the hydraulic pressure prevailing in the conduits of the several braking systems.

Another object of the invention is to provide a power brake arrangement in which the operator when depressing the brake pedal feels a resistance proportionate to the actually applied braking force.

In accordance with one power brake arrangement of the prior art, a pressure member transmits by a spring the muscular force of the operator to an auxiliary piston by which the force is transmitted to a rubber disk, and from the same to a hydraulic piston. The rubber disk remains practically undeformed, since the force exerted by the driver is insufficient for deforming the rubber disk. However, when the power means become operative, the rubber disk is deformed and exerts a corresponding counterpressure on a valve piston which is transmitted to the brake pedal.

This arrangement has the disadvantage that the rubber disk is deformed only after the auxiliary force produced by the power means is substantial, corresponding to a hydraulic pressure between 20 and 25 atm.

The greatest disadvantage of this construction of the prior art is that the transmission of the counterpressure which permits the driver to determine and control the braking effect, does not take place at the moment in which the power means become effective, but only after the power produced by the same has reached a certain amount. Until this moment, the braking effect is rapidly increased, without any corresponding counterpressure on the brake pedal which would inform the driver of the increased brake effect. As a result, the car may be overbraked at slow and medium speeds, so that the passengers are thrown forwardly with a great force.

Due to the fact that elastic intermediate elements are used by the prior art, there is no true functional relationship between the muscular force applied by the driver to the brake pedal, and the actual braking force and effect.

Due to certain advantages of disk brakes, the same are preferable to drum brakes. Consequently, pneumatic multichamber power brakes are more widely used. An unreliable indication of the applied brake force by the counterpressure acting on the brake pedal is dangerous even if a single chamber power means is used, since the driver may cause a brake operation locking the wheels which results in skids on a slippery road surface. A reliable indication of the applied brake force is even more required for multichamber power means, because very substantial forces act on the brakes. The tendency of power operated brakes to suddenly increase the braking effect, is increased substantially with the square of the auxiliary power. Traffic safety requires that the braking effect is at all times the same function of the pressure exerted by the driver on the brake pedal, so that the driver can gradually obtain the desired braking force and effect by depressing the brake pedal. In the following description, reference will be made only to a single chamber power booster.

The above described brake arrangements according to the prior art are intended only for braking arrangements having a single brake system for all wheels of the car, and are not suitable for brake arrangements in which independent brakes act on the front and rear wheels of a car, for example. In a brake arrangement including two brake systems, the same counterpressure is transmitted to the brake pedal, irrespective of whether the brakes of both systems are operable, or whether one of the brake systems has failed. After failure of a brake system, the operator applies insufficient muscular force to the brake pedal since he assumes the counterpressure to correspond to the actually applied brake force, which is not the case if one of the brake systems fails.

In order to apply the principle of using a sensing piston in brake arrangements having two brake systems, it has been proposed to provide both master pistons of the two brake systems with feeler pistons. When the first hydraulic brake system fails, the power means operates the first master piston until the same abuts the second master piston, while the feeler piston of the first hydraulic brake system engages the feeler piston of the second hydraulic system so that the counterpressure of the second hydraulic brake system is transmitted from both sensing pistons to the brake pedal opposing the force exerted by the driver on the same.

If in such a brake arrangement the second hydraulic brake system fails, the second master piston is pressed by the oil pressure of the first hydraulic brake system into abutment with the end of the master cylinder, and the first master piston with its sensing pistons follows correspondingly, and the first sensing piston transmits as before the counterpressure of the first hydraulic brake system.

In such an arrangement, the counterpressure is indicated by the sensing piston of the first hydraulic brake system as long as the first hydraulic brake system operates properly. The sensing piston of the second hydraulic brake system functions only if the pressure in the first hydraulic brake system fails. Consequently, the device transmits always the same counterpressure to the brake pedal, irrespective of whether both hydraulic brake systems are operative or whether one has failed so that only one brake system operates.

The most important disadvantage of this construction of the prior art is that upon failure of one hydraulic brake system, the first master piston together with its sensing piston moves rapidly forward so that no counterpressure is momentarily applied to the brake pedal, and the driver, encountering no resistance at the brake pedal, may assume that the brake arrangement has totally failed. This highly objectionable lack of indication of the actual brake conditions by a counterpressure acting on the brake pedal, is also a disadvantage of other constructions of the prior art, and has sometimes resulted in panic of the driver and consequent accidents upon release of the apparently inoperative brake pedal.

Another disadvantage of known brake arrangements including means for indicating the brake forces by a counterforce acting on the brake pedal, is the comparatively long time required between actuation of the brake pedal by the driver, and the actual application of the maximum brake pressure to the brake cylinders whose brake pistons act on the brakes of the car. Such delays were not only accepted by the prior art, but sometimes desired in order to cover up the transition from the braking force produced by the depression of the brake pedal by the driver, and the braking force produced after actuation of the power booster.

This delay was in the prior art intended to prevent that the sealing means of the master pistons are moved over the ports of the oil inlet ducts after high pressure had already been built up in the master cylinder. Consequently, the power means was permitted to become effective only after the sealing means of the master pistons had passed the inlet ports. It will be understood by those skilled in the art that a sealing means, particularly a sealing lip of a sealing ring when sliding under high pressure over an inlet port, is pressed into the port so that the sealing lip is torn.

The time delay present in the known power brake arrangements between brake actuation and production of the full braking force is mainly caused by flexible and yielding power transmitting elements.

However, drivers as well as automobile manufacturers have come to the conclusion that in dense city traffic, a rapidly acting brake is preferable to a very powerful brake.

However, in accordance with the prior art, it has not been possible to reduce the time interval between the braking impulse at the brake pedal, and the building up of the maximum brake pressure in the brake cylinders to less than 280 milliseconds. Assuming a speed of 70 to 80 miles per hour which is not uncommon on throughways, the car moves 11 meters after actuation of the brake pedal and before the build up of the pressure in the hydraulic brake system. It is evident that such a delay may cause collisions.

It is a further object of the invention to overcome the above-described disadvantages of power brake arrangements according to the prior art.

More particularly, it is an object of the invention to provide a braking arrangement having a plurality of hydraulic brake systems, and which causes a counterpressure at the brake pedal varying proportionately to the actually prevailing hydraulic pressure in the conduits of the several brake systems, irrespective of all brake systems operate properly, or if one or the other brake system has failed.

Another object of the invention is to provide a power brake arrangement in which the failure of a brake system will not cause the disappearance of the counterpressure on the brake pedal. Another object of the invention is to reduce the time interval between actuation of the brake pedal, and actuation of the power means by which the braking force of the apparatus is increased.

With these objects in view, one embodiment of the invention comprises first and second brake systems respectively including first and second conduits; master cylinder means; first and second master piston means forming in the master cylinder means first and second chambers communicating with the conduits of the brake systems; operating means controlled by power means for moving the first and second piston means so that the pressure is increased in the conduit means for power operating the brake systems; and operator-actuated control means, preferably including a brake pedal and a control rod, movable in one direction for actuating the master piston means and the operating means.

The control means include first and second sensing means, preferably in the form of reaction pistons located in cylinder bores of the first and second master pistons, and being responsive to the pressures in the first and second chambers and conduit means to resist movement of the control means with a total counterforce depending on the pressures prevailing in the first and second chambers and conduit means. Upon failure of one of the brake systems, the counterforce depends on the pressure in the conduit means of the respective other brake system, and consequently represents the braking force applied by the operative brake system.

In the preferred embodiment of the invention, the cylinder bores in the first and second master pistons have different diameters, and the pistons of the control rod respectively have corresponding diameters and cross sections and slide in the cylinder bores, respectively. These pistons are subjected to the pressures prevailing in the first and second chambers of the master cylinder, and since they are connected by the connecting rod to the brake pedal, they indicate at the brake pedal the pressures prevailing in the conduits of the brake systems.

The different cross sections of the reaction pistons and of the corresponding cylinder bores in the master pistons are dimensioned and arranged so that upon failure of one or the other hydraulic brake system, maintenance of the same counterpressure on the brake pedal indicates a pressure in the hydraulic conduit of the operative brake system which is higher in accordance with the ratio of the cross sections of the reaction pistons. The cross sections of the pressure indicating pistons and of the cylinder bores in which they are located, can be dimensioned and arranged so that the counterpressure acting on the brake pedal, and being felt by the operator, is in any brake situation, even if one of the brake systems fails, the same function of the total brake force acting on the brake wheels.

It is advantageous to provide on the control rod a flanged collar which is formed with a valve seat for the central valve portion of the flexible membrane which forms part of the power means, and is operated by a pressure difference in chambers located on opposite sides of the membrane.

The control rods may extend through a central opening in the valve portion of the membrane directly to the lever of the brake pedal and abut the same, but in a modified arrangement, a recess is provided in the collar into which a push rod operated by the brake pedal projects.

A spring is provided between the collar of the control rod and a central wall of the suction chamber of the pneumatic power means, and preferably has a greater spring force than the spring which acts on the piston of the power means, and is preferably adjustable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a schematic view illustrating a motor car provided with the power brake arrangement of the invention.

Figure 1:
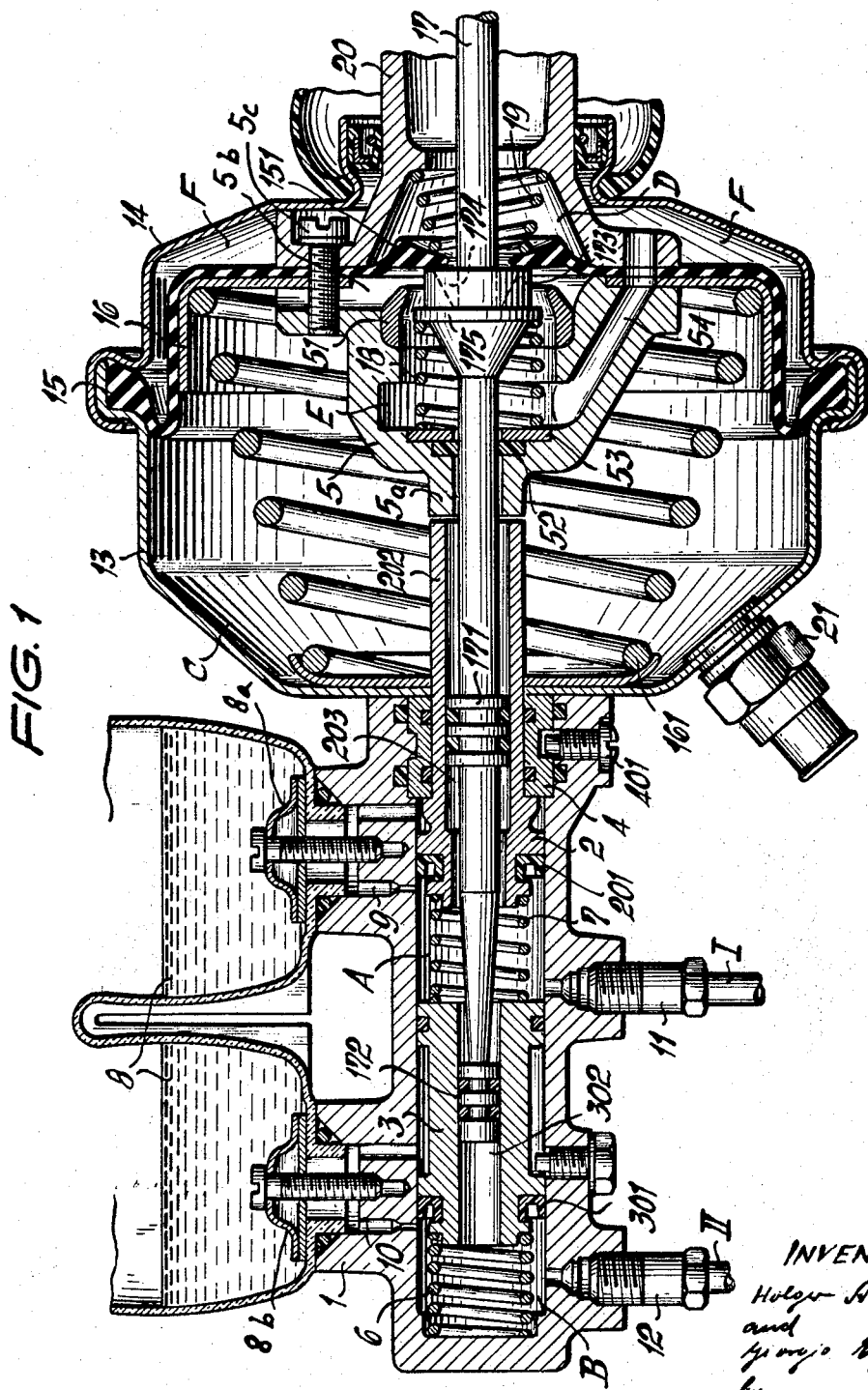
FIG. 1 is an axial sectional view illustrating a power brake arrangement for two brake systems in accordance with one embodiment of the invention.

Referring now to the drawings, a master cylinder 1 has a cylinder bore in which the master piston 2 of a first brake system and a master piston 3 of a second brake system are located in tandem fashion so that a first cylinder chamber A is formed between pistons 2 and 3, and a second cylinder chamber B is formed between the second piston 3 and an end wall of master cylinder 1. The first cylinder-chamber A communicates with a first conduit 11 forming part of a brake system I, and the second cylinder chamber B communicates with a conduit means 12 forming part of a second brake system II. Each brake system includes two operating cylinders with operating pistons acting on the brakes of a pair of wheels of a motor car, for example, in a well known manner which is not an object of the invention. The brake system I may, for example, control the brakes of the front wheels of a car, and the brake system II may control the brakes of the rear wheels of the car, but other arrangements are also possible.

Master piston 2 of the first brake system I is provided with a sealing means 201 in the region of the cylinder chamber A, and master piston 3 is provided with a sealing means 301 in the region of the second cylinder chamber B. Master piston 2 has a portion of lesser diameter 202 slidably guided in an annular sealing body 4 which, together with piston 2 and sealing means 201, seals the open end of master cylinder 1. A holding screw 401 secures sealing member 4 to the end of master cylinder 1, sealing rings being provided between the sealing member 4 and the reduced portion 202 of piston 2 on one hand, and between sealing member 4 and master cylinder 1 on the other hand. In addition to sealing means 302, a sealing ring is provided at the other end of master piston 3.

A power means or booster is provided for operating master pistons 2 and 3, and thereby the two brake systems I and II with a greater force than can be produced by the driver of the car. The power means is of the well known type in which the required force is obtained by a membrane operated by negative pressure.

The casing of the power means includes two shells 13 and 14 which are connected to each other by crimped annular edge portions between which the annular edge of a pot-shaped rubber membrane 15 is clamped. Membrane 15 has a circular central flange with a central opening. In the position of rest illustrated in FIG. 1, an annular piston 16 of angular cross section abuts one side of membrane 15 under the action of a coil spring 161 whose end abuts a fixed wall portion of shell 13. The tubular reduced end 202 of master piston 2 projects through an opening in shell 13 into a low pressure chamber C formed by shell 13 and membrane 15. The free end of portion 202 is located adjacent an annular portion 5a of a pressure body 5 which as an inner chamber E communicating through a conduit 5b with low pressure chamber C. Screws 5c secure another pressure body 20 to pressure body 5, and membrane 15 and annular piston 16 are clamped between pressure bodies 5 and 6. Elements 5, 20, 15 and 16 constitute the operating means of the power means by which the master pistons 2 and 3 are operated.

An annular valve seat member 51 is secured to pressure body 5 and forms a valve seat opposite the valve portion 151 of membrane 15, valve portion 151 being located in a chamber D in pressure body 20 which communicates with the atmosphere. Membrane 15, pressure body 20, and shell 14 form a chamber F which communicates through a conduit 54 passing through pressure bodies 5 and 20 with the inner low pressure chamber E in pressure body 5. A suction line 22 connected to the engine of the car produces subatmospheric pressure in chamber C, conduit 5b, chamber E, conduit 54, and chamber F.

A piston rod 17 passes through central openings in pressure body 20, valve portion 151, valve seat member 51, annular portion 5a, a cylinder bore 203 in master cylinder 2, cylinder chamber A, and into cylinder bore 302 in master piston 3 which connects cylinder chamber A with cylinder chamber B.

Piston rod 17 has a first reaction piston 171 located in cylinder bore 203, and a second reaction piston 172 located in cylinder bore 302 and separating cylinder chambers A and B. Each reaction piston 171, 172 is responsive to the pressure prevailing in the respective cylinder bore 203, 302, cylinder chambers A and B, and brake conduits 11 and 12. As will be explained hereinafter in greater detail, piston 171 senses the pressure in the first brake system I, and piston 172 senses the pressure in the second brake system II. A first coil spring 7 is located in cylinder chamber A between master pistons 2 and 3, and a second coil spring 6 is located in cylinder chamber 5 between master piston 3 and an end wall of master cylinder 1 so that the master pistons assume the normal position of rest illustrated in FIG. 1.

Piston rod 17 has a flanged portion or collar of greater diameter located within annular valve seat member 51.

A spring 18 located in chamber E and abutting an adjustment ring 53 and the flanged portion 175, urges piston rod 17 to the right as viewed in FIG. 1, to the illustrated position in which the portion 173 abuts the valve portion 151 of membrane 15. Portion 173 is annular and formed with a frustoconical recess 174 so that portion 173 forms a valve seat for valve portion 151. Another spring 19 abuts a transverse wall of pressure body 20 and the other side of valve portion 151 to urge the same against the valve seat of portion 173. A sealing ring 52 seals in the inner chamber E, and pistons 171 and 172 are formed with annular recesses in which sealing rings are located so that the cylinder chambers A and B are sealed from each other and from the low pressure chamber C. The pressure exerted by spring 18 on piston rod 17 can be adjusted by providing additional adjusting rings 53.

A container 8 contains brake fluid 8, for example, oil of a suitable viscosity, in separate cavities which respectively communicate through valves 8a and 8b with inlet ducts 9 and 10 in master cylinder 1 which open, respectively, into cylinder chambers A and B. When master pistons 2 and 3 move toward the right as viewed in FIG. 1, that is toward a brake pedal connected with the end of piston rod 17 by a suitable conventional linkage, as shown in FIG. 3, oil is sucked through inlet ducts 9 and 10 into cylinder chambers A and B which are sealed by the annular sealing lips 201 and 301. When master pistons 2 and 3 move toward the left as viewed in FIG. 1, the annular sealing lips 201, 301 move beyond the inlet ducts 9 and 10 so that the pressure in chambers A and B, and in conduits 11 and 12 of brake systems I and II is increased, and the auxiliary pistons of the brake systems I and II actuate the associated brakes with a force determined by the pressure in cylinder chambers A and B.

Cylinder bore 302 in master cylinder 3 has a smaller diameter than cylinder bore 203 in master cylinder 2, and of course the corresponding reaction pistons 171 and 172 have corresponding different diameters. Spring 18 is adjusted to have a spring force several kilograms higher than the spring force of spring 161 which acts on annular piston 16 and membrane 15.

Operation

When the driver depresses the brake pedal, piston rod 17 is moved toward the left as viewed in FIG. 1 together with pistons 171 and 172. Operating means 5, 20 follow the movement which is transmitted by spring 18. Spring 19 acts on valve portion 151 of membrane 15 so that the valve portion 151 remains at first in engagement with the valve seat of portion 173, separating chamber D in which atmospheric pressure prevails, from chambers E, F and C in which subatmospheric pressure prevails.

A small amount of oil is displaced by the movement of pistons 171, 172, and the pressure in cylinder chambers A and B and in the brake systems I and II is slightly increased so that the brakes exert a light braking effect just sufficient for slowing down in a curve or temporarily reducing the speed slightly while driving in city traffic. The pressure in cylinder chambers A and B acts as counterpressure on reaction pistons 171 and 172 so that the driver feels a light resistance against the pressure he exerts on the brake pedal.

When the driver further depresses the brake pedal, the operator actuated control or piston rod 17 moves farther toward the left as viewed in FIG. 1 so that the valve seat of portion 173 is located in the same plane as the valve seat of annular member 51, and valve portion 151 of membrane 15 abuts both valve seats under the action of spring 19. While the low pressure chambers C, E and F are still separated in this position by membrane 15 from chamber D in which atmospheric pressure prevails, the communicating chambers E and F are now separated from the low pressure chamber C since conduit 5b no longer communicates with chamber E. The displaced pressure body 5 of the operating means displaces master piston 2 to the left as viewed in FIG. 1, so that master piston 3 is also displaced. Sealing means 201 and 301 slide past inlet ducts 9 and 10. The pressure is only moderately increased, and it is avoided that the lips of sealing means 201, 301 are pressed by high pressure into the ports of inlet ducts 9 and 10.

Further depression of the brake pedal and displacement of control rod 17 moves the valve seat of portion 173 to a position in which valve portion 151, which rests on the valve seat of annular member 51, cannot follow so that a gap is formed between portion 173 and valve portion 151 of membrane 15 which permits air under atmospheric pressure to flow from chamber D through the central opening in the annular valve portion 151, and through the gap between the same and portion 173 into chamber E and through conduit 54 into chamber F. The low pressure chamber C is still separated from atmospheric pressure by the abutment of valve portion 151 on the valve seat of annular member 51.

Due to the fact that atmospheric pressure prevails in chamber F on one side of the flexible membrane 15, while subatmospheric pressure prevails on the other side in chamber C, membrane 15 is moved together with annular piston 16 to the left as viewed in the drawing. Since operating means 5 and 20 are secured to annular piston 16, they also move to the left, and portion 5a of pressure body 5 pushes master piston 2 to the left so that the pressure in cylinder chamber A, conduit means 11, and in the pistons of the brake system I is increased due to the booster effect of the power means 5, 20, 15, 151, 13, 14.

The pressure in cylinder chamber A acts on master piston 3 and displaces the same so that the pressure is increased in cylinder chamber B, conduit means 12, and in the cylinders of the brake system II.

As explained above, during the initial part of the movement of control rod 17, the pressure in cylinder chambers A and B and in the conduits of the brake systems is only increased by the action of pistons 171 and 172 while control rod 17 is displaced by the operator slightly depressing the brake pedal. A very light brake action results, which is required in curves and city traffic. Since the operator has to overcome the reaction force or counterforce exerted on reaction pistons 171 and 172 by the counterforce of the pressures in cylinder chambers A and B, the operator feels a counterforce which is a measure of the braking force exerted by the brake systems I and II.

When the force of spring 18 is overcome by increased pressure exerted by the operator on the brake pedal, and the operating means 5, 20, 15 are displaced by the operator during the movement to the position in which valve portion 151 abuts both valve seats of members 51 and 173, master pistons 2 and 3 are displaced by muscular force to increase the brake action. The movement of master pistons 2 and 3 increases the pressure in the cylinder chambers A and B, and in the cylinder bores 203 and 302, so that a higher pressure acts on reaction pistons 171 and 172, indicating to the operator the pressure prevailing in the brake systems, and the increase of the brake force. Therefore, the driver feels the effect of his gradual depression of the brake pedal. Pistons 171 and 172 respond to the counterforces as sensing means for the pressures in the chambers A and B.

When the valve seat of portion 173 separates from valve portion 151 of membrane 15, and the booster action of the power means starts, the pressures in conduits 11 and 12 and in brake systems I and II are rapidly increased without any action by the operator. However, the increased pressures in cylinder chambers A and B act on the reaction pistons 171 and 172 so that a counterforce representing the actually applied brake force acts on control rod 17, and resists further depression of the brake pedal. The operator feels the pressure increase produced by the power means immediately, and the counterforce which he has to overcome is a function of the force actually applied to the brakes by the brake pistons in the brake cylinders, communicating with conduits 11 and 12. The transition from muscular actuation of the brakes to power actuation of the brakes is immediately noticeable to the operator due to the sudden increase of the counterpressure which he has to overcome when depressing the brake pedal. Consequently, the operator can operate the brake pedal and control rod 17 in such a manner that at all times a braking force is applied which is required by the prevailing conditions, and that the car is not overbraked and brought to a sudden stop by the action of the power means.

The pressure sensing action of reaction pistons 171 and 172 is of particular importance if one of the brake systems fails, for example due to a leakage in one of the conduits 11 or 12 leading to the brake cylinders.

Figure 2:
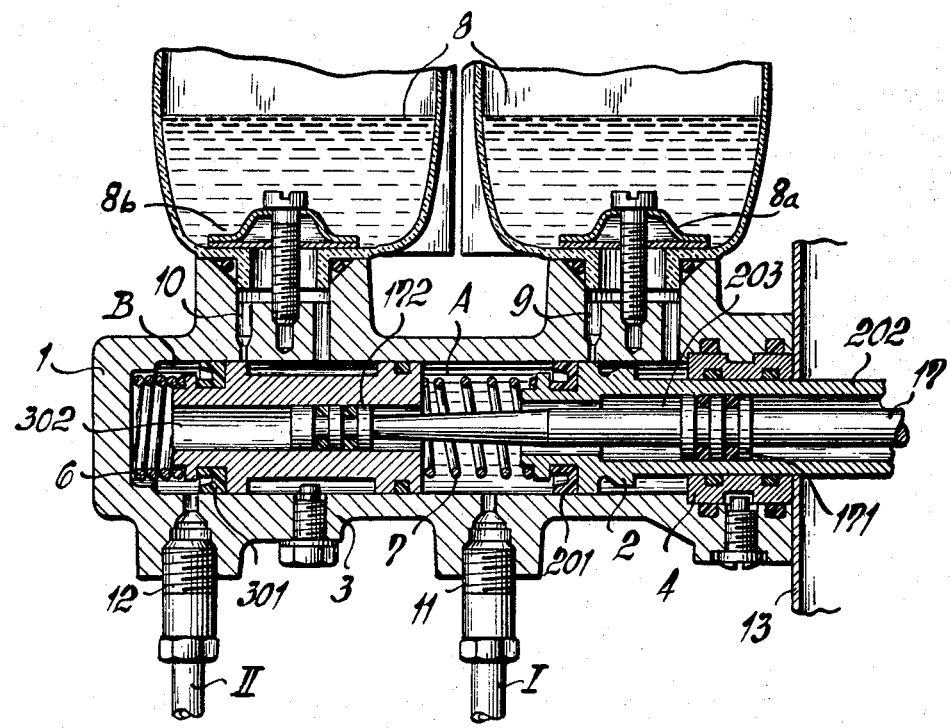
FIG. 2 is a fragmentary axial sectional view illustrating the power brake arrangement of FIG. 1 in another operational position assumed upon failure of the second brake system.

Assuming that the pressure in the second brake system II fails, there will be no pressure in cylinder chamber B, and the pressure prevailing in cylinder chamber A pushes master piston 3 against the resistance of spring 6 to the end position illustrated in FIG. 2. Master piston 2 also moves to the left and assumes the position shown in FIG. 2.

Assuming that the failure of the brake system II takes place while the booster action of the power means is effective, the very rapid movement of master pistons 2 and 3 to the position of FIG. 2 is relative to control rod 17 and pistons 171 and 172. Control rod 17 and pistons 171, 172 follow master pistons 2 and 3 toward the left due to the pressure exerted by the operator on the brake pedal in accordance with the previously prevailing pressure in chambers A and B. This movement of pistons 171, 172 with control rod 17 is slow and takes place against the counterpressure of the rapidly built up pressure in pressure chamber A, which acts on piston 171.

While before the failure of brake system II, the sum of the pressures in cylinder chambers A and B provided the counterpressure acting on control rod 17, after the failure only the pressure in chamber A acts on piston 171 so that the counterforce resisting the depression of the brake pedal by the operator is decreased.

The operator feels the decrease of the counterforce, and increases his pressure on the brake pedal to obtain a greater brake action, which is required since one of the brake systems has failed, and the other brake system must now take over the brake action of the failed brake system.

Irrespective of the failure of one brake system, a counterforce acts on the operator actuated control means including the brake pedal and control rod 17 with pressure sensing reaction pistons 171 and 172. However, the sensed pressure which is felt by the driver is only the pressure in cylinder chamber A, and consequently the driver feels a smaller counterforce on the brake pedal, clearly indicating to him a smaller braking force, corresponding to the actually effective braking force produced by the brake system I.

This is an extraordinary advantage of the invention since the driver is informed at all times about the actual braking force produced by the power means.

If the same pressure is applied by the operator to the brake pedal, a change of the pressure is indicated which corresponds to the ratio between the cross sections of cylinder bores 203, 302 and pistons 171, 172.

By suitably dimensioning the cross sections and diameters of pistons 171 and 172 and cylinder bores 203, 302, the pressure indication of pistons 171, 172 can be made to represent the actual braking effect under all operational conditions, and even if the brakes of one brake system have a greater or lesser braking effect than the brakes of the respective other brake system. For example, if one brake system controls the brakes of the front wheels, and the other brake system controls the brakes of the rear wheels, it is customary to provide a brake force for the rear wheels which is between 10% and 30% less than the brake force acting on the front wheels.

Assuming that the brakes of each brake system I and II have the same braking effect, for example, if one brake system includes the brakes of the left front wheel and the right rear wheel, and the other brake system includes the brakes of the right front wheel and left rear wheel, the ratio between the effective surface $q_1$ of pressure indicating piston 171 and the effective surface $q_2$ of the pressure indicating piston 172, can be expressed by the following equation:

$$q_1 = 2q_2$$

The cross section of the piston rod portion between pistons 171 and 172 is immaterial because the side of piston 172 facing toward piston 171 is subjected to the pressure in cylinder chamber A in a direction opposite to the direction of the indicated pressure. It will be seen that upon failure of the brake system II and lack of pressure in cylinder chamber B, the difference between the pressure exerted on piston 171 and on piston 172 by the oil in cylinder chamber A indicates to the operator the brake force actually applied by brake system I. During operation of both brake systems, however, the counterforce acting on control rod 17 is increased by the pressure acting on the left end face of piston 172 due to the prevailing pressure in cylinder chamber B.

If the two brake systems operate brakes which are to apply different brake forces, the cross sections of the cylinder bores and reaction pistons must be changed accordingly.

Assuming that the first brake system I controls the brakes of the front wheels, and the second brake system II controls the brakes of the rear wheels, as shown in FIG. 3, and further assuming that 60% of the braking action is to be applied to the front wheels, and 40% to the rear wheels, the ratio between the cross sections of the cylinder bores and pistons is expressed by the following equation:

$$q_1 = 2.5 q_2$$

If the pressure in the first brake system I fails, master piston 2 encounters no resistance in cylinder chamber A and moves toward master piston 3, compressing spring 7. The counterforce acting on piston 171 disappears, and piston 172 moves farther into cylinder bore 302. The operator merely feels the failure of the braking system inasfar as he must exercise relatively more muscle power in order to get a certain desired braking effect, and the counterforce resisting the depression of the brake pedal is reduced. However, the counterforce is always present, and does not disappear as in other known brake systems. A counterforce acting on control rod 17 and the brake pedal is produced by reaction piston 172 on which the pressure of cylinder chamber B acts, and this pressure is increased by the movement of piston 172 toward pressure chamber B by which oil is displaced from cylinder bore 302.

Although a brake system has failed, the operator still feels that another brake system is operative, while in some constructions according to the prior art, no counterforce is exerted on the brake pedal in the moment of the failing of one of the brake systems, which may cause panic, and the driver who does not feel any resistance of the brake pedal may assume the brakes to be totally inoperative and release the brake pedal although he is actually able to control the brake action of the brake system which has remained operative. Other known constructions exert a counterforce always proportional with the muscular efforts. After the failing of one brake system, the operator still feels a counterforce proportional to the braking power of both brake systems, although the braking power of only one system is available. This very great disadvantage of prior art constructions is completely overcome by the construction of the present invention in which the driver feels a resistance on the brake pedal proportional to the actually applied brake force, even after failure of one brake system.

Assuming that both brake systems produce the same brake force, the counterpressure acting in cylinder bore 302 on reaction piston 172 is about half the total pressure acting on pistons 172 and 171 before the failure of brake system I, and consequently the counterpressure felt by the operator corresponds exactly to the still applied brake force.

From the above discussion of several operational conditions of the apparatus, it will become apparent that the reliable indication of the brake force proportional to the hydraulic pressure in the brake systems is assured, if the effective surface areas of the reaction pistons 171, 172 are dimensioned in proportion to the effective surface areas of the master cylinder and of master pistons 2 and 3. The indication of the pressure conditions to the oeprator, which takes place by direct transmission from the reaction pistons 171, 172 to the brake pedal, takes place momentarily, and when a brake system fails, one of the two reaction pistons 171, 172 is still under pressure so that the operator merely depresses the brake pedal farther against the still prevailing counterforce acting on control rod 17.

A substantial advantage of the invention resides in that the return indication after failure of a brake system maintains an exact proportionality with the fluid pressure still prevailing in the hydraulic brake system which means that a counterpressure on the brake pedal remaining the same indicates a higher hydraulic pressure in the conduit system corresponding to the ratio of the effective surfaces of the pressure indicating pistons.

By making spring 18 adjustable, for example by interposing several or thicker disks 53 between spring 18 and pressure body 5, tearing of the sealing lips 201, 301 is prevented by placing the sealing lips in the position of rest of the apparatus directly at the ports of inlet conduits 9 and 10.

The valve arrangement 51, 151, 173 has been described in detail since it cooperates with the other elements of the apparatus in a new and unobvious manner to obtain a very fast reaction of the apparatus to pressure applied by the operator to the brake pedal. However, power means per se are not an object of the present invention.

The reaction time required for building up a pressure of 125 atm. in the brake cylinders is 10 milliseconds, a speed which cannot be obtained by constructions according to the prior art.

Irrespective of the fact that the present invention constitutes a considerable advance of the art, it can be inexpensively manufactured due to its simplicity.

It will be understood that each of the elements described above, or two or more together, may also find a useful application in other types of braking arrangements, differing from the types described above.

While the invention has been illustrated and described as embodied in a power brake arrangement for multiple brake systems including sensing means for indicating the brake forces applied by the brake systems at the brake pedal, it is not intended to be limited to the details shown, since various modifications and structural changes may be made without departing in any way form the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Power brake arrangement comprising, in combination, first and second brake systems respectively including first and second conduit means for a fluid; master cylinder means for the brake fluid; first and second master piston means movable in said master cylinder means and forming in the same first and second chambers respectively communicating with said first and second conduit means; power means; an operating means controlled by said power means for moving said first and second piston means in said master cylinder means so as to increase the pressures in said first and second chambers and in said first and second conduit means for power operating said first and second brake systems; and operator-actuated control means movable in one direction for actuating said first and second master piston means and said power means, and including first and second sensing means mechanically connected to each other for movement together in said one direction and in the direction opposite to the same, and being responsive to the pressures in said first and second chambers and conduit means to resist movement of said control means in said one direction with a total counter force depending on the sum of the pressures prevailing in said first and second chambers and conduit means so that upon failure of one of said brake systems, said counter force is reduced and depends on the pressure in, and on the braking force exerted by the respective other brake system.

2. Power brake arrangement as defined in claim 1 wherein said first and second sensing means respectively have pressure surfaces whose areas are in such a ratio that said counter force is proportional to the sum of the pressures in said first and second conduit means irrespective of whether both said brake systems are operative, or only one of said brake systems is operative due to failure of the other brake system.

3. Power brake arrangement as defined in claim 1 wherein said first and second piston means have first and second cylinder bores communicating with said first and second chambers, respectively, and wherein said first and second sensing means respectively include first and second mechanically connected reaction pistons respectively located in said first and second cylinder bores and subjected to the pressures in said first and second chambers to exert said counter force on said control means.

4. Power brake arrangement as defined in claim 3 wherein said reaction pistons have pressure areas in a ratio selected so that said counter force depends in accordance with a predetermined function on the total brake force exerted by said first and second brake systems, irrespective of whether both of said brake systems are operative, or only one brake system is operative.

5. Power brake arrangement comprising, in combination, first and second brake systems respectively including first and second conduit means for a brake fluid; master cylinder means forming a cylinder communicating at axially spaced points with said first and second conduit means; first and second master pistons located axially spaced from each other in said cylinder and forming in the same first and second chambers respectively communicating with said first and second conduit means, said first and second master pistons having first and second cylinder bores respectively communicating with said first and second chambers; power means; an operating means controlled by said power means for moving said first master piston whereby said second master piston is also moved whereby the pressure in said first and second chambers and in said first and second conduit means is increased for power operating said first and second brake systems; and an operator-actuated control rod having a portion for actuating said power means, and including first and second reaction pistons respectively located in said first and second cylinder bores and responsive to pressures in said first and second chambers to resist movement of said control rod in said one direction with a counter force depending on the sum of the pressures prevailing in said first and second chambers and conduit means so that upon failure of one of said brake systems, said counter force is reduced and depends on the pressure in, and the braking force exerted by the respective other brake system.

6. Power brake arrangement as defined in claim 5 wherein said second cylinder bore connects said first and second chambers; wherein said first reaction piston is a portion of said control rod; wherein said second reaction piston forms one end portion of said control rod and separates said first and second chambers and first and second conduits from each other; and comprising a brake pedal operatively connected to the other end portion of said control rod.

7. Power brake arrangement as defined in claim 5 wherein said first and second reaction pistons have effective pressure surfaces whose areas are in such a ratio that said counter force is proportional to the sum of the pressures in said first and second conduit means irrespective of whether both said brake systems are operative, or only one of said brake systems is operative due to failure of the other brake system.

8. Power brake arrangement as defined in claim 5 wherein the pressure surface areas of said first and second reaction pistons and cylinder bores are different.

9. Power brake arrangement as defined in claim 8 wherein said pressure surface areas are in a ratio selected so that said counter force depends in accordance with a predetermined function on the total brake force exerted by said first and second brake systems, irrespective of whether both of said brake systems are operative, or only one brake system is operative.

10. Power brake arrangement as defined in claim 5 wherein the effective pressure areas of said reaction pistons and of said cylinder bores are dimensioned and arranged so that upon failure of either one of said brake systems the same counter force indicates a higher pressure in the conduit means of the respective other brake system proportionate to the ratio of said effective cross sections 11. Power brake arrangement as defined in claim 5 wherein said portion of said control rod is a flanged portion having a valve seat and adapted to be connected with a brake pedal; wherein said power means includes a membrane means having a valve portion cooperating with said valve seat and being secured to said operating means; and including spring means between said flanged portion and said operating means.

12. Power brake arrangement as defined in claim 11 wherein said flanged portion has a recess adapted to receive the end of a push rod operated by a brake pedal.

13. Power brake arrangement as defined in claim 11 wherein said power means include a low pressure chamber bounded by said membrane means, and including another spring means located between a fixed wall of said low pressure chamber and said membrane means, said first mentioned spring means having a greater spring force than said other spring means.

14. Power brake arrangement as defined in claim 13 and including means for adjusting said first mentioned spring means.

References Cited

UNITED STATES PATENTS

| | | | |
|---|---|---|---|
| 3,109,287 | 11/1963 | Gardner | 60—54.6 |
| 3,159,975 | 12/1964 | Ayers | 60—54.6 |

MARTIN P. SCHWADRON, *Primary Examiner.*

R. R. BUNEVICH, *Assistant Examiner.*

U.S. Cl. X.R.

60—546; 188—152